US008896244B2

(12) United States Patent
Kleinau

(10) Patent No.: US 8,896,244 B2
(45) Date of Patent: Nov. 25, 2014

(54) MOTOR CONTROL SYSTEM FOR LIMITING REGENERATIVE CURRENT

(75) Inventor: Julie A. Kleinau, Bay City, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 13/327,327

(22) Filed: Dec. 15, 2011

(65) Prior Publication Data
US 2013/0154524 A1 Jun. 20, 2013

(51) Int. Cl.
H02P 6/00 (2006.01)

(52) U.S. Cl.
USPC ................. 318/400.01; 318/400.12; 318/811; 318/139

(58) Field of Classification Search
USPC .............................. 318/811, 812, 139, 400.12
See application file for complete search history.

(56) References Cited

U.S. PATENT DOCUMENTS

| | | | |
|---|---|---|---|
| 5,652,495 A | 7/1997 | Narazaki et al. | |
| 6,222,334 B1 | 4/2001 | Tamagawa et al. | |
| 6,465,975 B1* | 10/2002 | Naidu | 318/430 |
| 6,605,912 B1* | 8/2003 | Bharadwaj et al. | 318/400.09 |
| 6,900,607 B2 | 5/2005 | Kleinau et al. | |
| 7,071,649 B2 | 7/2006 | Kleinau et al. | |
| 7,199,549 B2 | 4/2007 | Kleinau et al. | |
| 7,394,214 B2* | 7/2008 | Endo et al. | 318/432 |
| 7,576,506 B2 | 9/2009 | Kleinau et al. | |
| 2002/0175649 A1* | 11/2002 | Reutlinger | 318/609 |
| 2007/0046126 A1* | 3/2007 | Sagoo et al. | 310/168 |
| 2009/0027000 A1* | 1/2009 | Gallegos-Lopez et al. | 318/722 |
| 2009/0234538 A1* | 9/2009 | Ta et al. | 701/41 |
| 2010/0140003 A1* | 6/2010 | Saha et al. | 180/65.285 |
| 2013/0013154 A1* | 1/2013 | Aoki | 701/42 |

FOREIGN PATENT DOCUMENTS

EP 2003010 A2 12/2008

OTHER PUBLICATIONS

Kirtley, James 6.061 Introduction to Electric Power systems, Spring 2011, Massachussetts Institute of technology, OpenCourseware.*
European Search Report for European Application No. 12196930.7, mailed from the European Patent Office on Mar. 22, 2013.
F. Briz, M.W. Degner and R.D. Lorenz; "Analysis and Design of current Regulators Using Complex Vectors"; IEEE Industry Applications Society; Annual Meeting; New Orleans, Louisiana; Oct. 5-9, 1997; pp. 1504-1511.
Lennart Harnefors and Hans-Peter Nee; "Model-Based Current Control of AC Machines Using the Internal Model Control Method"; IEEE Transactions on Industry Applications; vol. 34, No. 1; Jan./Feb. 1998; pp. 133-141.

* cited by examiner

Primary Examiner — Bentsu Ro
Assistant Examiner — Bickey Dhakal
(74) Attorney, Agent, or Firm — Cantor Colburn LLP

(57) ABSTRACT

A motor control system is provided, including a motor and a control module. The motor operates at a rotational velocity, and creates a regenerative current. The motor has a target field weakening current that is configured for limiting the regenerative current to a threshold value. The control module is in communication with the motor. The control module receives a motor torque command. The control module includes control logic for identifying the target field weakening current based upon the motor torque command and the rotational velocity of the motor.

20 Claims, 4 Drawing Sheets

MOTOR CONTROL SYSTEM FOR LIMITING REGENERATIVE CURRENT

FIELD OF THE INVENTION

The present invention relates to a motor control system and in particular to a motor control system that is configured for limiting a regenerative current of a motor to a threshold value.

BACKGROUND OF THE INVENTION

Electrical power steering systems include an electrical motor and a controller having inverter drive circuitry. The combination of the electrical motor and the controller is sometimes referred to as an electric actuator. The electric actuator rotates in both directions of operation. That is, the electric actuator may operate in a clockwise as well as a counterclockwise direction. The electric actuator also operates to produce torque in both directions as well. Thus, the electric actuator operates in all four quadrants of operation for a motor, which means that motor torque and motor velocity may each be positive or negative, resulting in four possible combinations of operation.

In the event that the electric actuator is operating in either quadrant 2 or quadrant 4, the electric actuator operates as a generator. That is, in the event the motor torque and the motor velocity have opposing signs (i.e., positive or negative), a supply current may become negative. The negative supply current is also referred to as a regenerative current. For example, in the event the electric actuator is connected to a vehicle battery, the regenerative current may be sent to the vehicle battery. Over time, vehicle battery performance decreases. Therefore, if battery performance is diminished or if a vehicle electrical system issue arises, the regenerative current may not be absorbed by the vehicle battery. Thus, there exists a need to limit the amount of regenerative current that is produced by the electric actuator when operating in either quadrant 2 or quadrant 4. In one approach to reduce the regenerative current to the vehicle battery, passive elements such as, for example, a resistive element may be used to dissipate the regenerative current. However, passive elements may be large and difficult to package.

In addition to reducing the regenerative current, the electric motor typically has torque versus speed requirements that need to be met for quadrant 1 and quadrant 3. Thus, an approach referred to as phase advance may be employed to meet torque versus speed requirements, which results in an increased amount of power generation from the electric motor. Phase advance involves allowing the phase of an applied motor voltage to shift versus a phase of a developed motor back electromotive force (BEMF). In the event that phase advance is not required to meet torque versus speed requirements in quadrant 2 and quadrant 4, a zero phase advance value may be used. This approach results in relatively simple software for the controller. However, a relatively large amount of motor current may be developed (i.e., in one example motor current may reach as high as about 220 Amps), which may create electrical stress on the internal circuitry of the controller, and may also create noise issues as well.

In another approach, phase advance may be used in quadrant 2 and quadrant 4 to meet torque versus speed performance requirements. In this approach, a phase advancement angle is calculated which causes a d-axis or field current of the electrical motor to be about zero in quadrant 2 or quadrant 4. This approach results in a lower amount of motor current that is developed, which in turn reduces the amount of electrical stress on the internal circuitry of the controller. However, this approach also results in relatively large amounts of regenerative current that may be produced.

SUMMARY OF THE INVENTION

A motor control system is provided, including a motor and a control module. The motor operates at a rotational velocity, and creates a regenerative current. The motor has a target field weakening current that is configured for limiting the regenerative current to a threshold value. The motor includes a plurality of motor circuit parameters. The control module is in communication with the motor. The control module receives a motor torque command. The control module includes control logic for identifying the target field weakening current based upon the motor torque command and the rotational velocity of the motor. The control module includes control logic for determining a phase advance angle to generate the target field weakening current. The control module includes control logic for determining a motor voltage command based on the motor torque command, the rotational velocity and the plurality of motor circuit parameters. The motor voltage command is applied at the phase advance angle.

In another embodiment, a motor control system is provided including a motor and a control module. The motor operates at a rotational velocity. The motor operates to create a regenerative current. The motor has a target field weakening current that is configured for limiting the regenerative current in a second quadrant and a fourth quadrant of operation to a threshold value, and includes a plurality of motor circuit parameters, a torque producing current, and a field weakening current. The control module is in communication with the motor. The control module receives a motor torque command. The control module includes control logic for identifying the target field weakening current based upon the motor torque command and the rotational velocity of the motor. The control module includes control logic for monitoring the motor for the torque producing current and the field weakening current. The control module includes control logic for calculating a target torque producing current based on the motor torque command. The control module includes control logic for comparing the torque producing current with the target torque producing current and the field weakening current with the target field weakening current. The control module includes control logic for determining a phase advance angle to generate the target field weakening current. The control module includes control logic for determining a motor voltage command based on the motor torque command, the rotational velocity, and the plurality of motor circuit parameters. The motor voltage command is applied at the phase advance angle.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
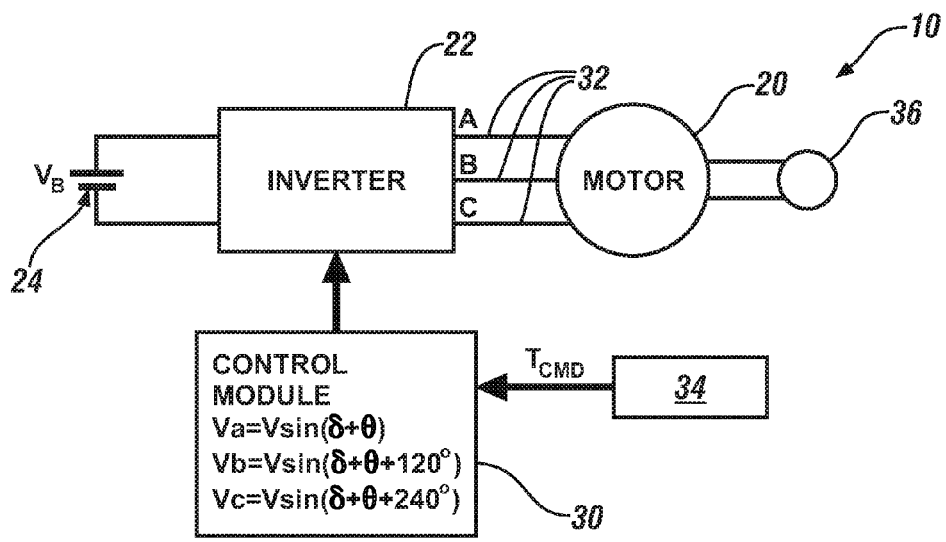
FIG. 1 is an exemplary schematic illustration of a motor control system.

Referring now to the Figures, where the invention will be described with reference to specific embodiments, without limiting same, FIG. 1 illustrates a motor control system 10 in accordance with one aspect of the invention. In the exemplary embodiment as shown, the motor control system 10 includes a motor 20, an inverter 22, a DC supply voltage 24, and a control module 30. The DC supply voltage 24 supplies a supply voltage $V_B$ to the motor 20. In one exemplary embodiment, the DC supply voltage 24 is a 12 Volt battery, however it is to be understood that other types of supply voltages may be used as well. The inverter 22 is connected to the motor 20 by a set of three connections 32 that are labeled as 'A', 'B' and 'C'. In one embodiment, the motor 20 is a permanent magnet DC brushless motor. The control module 30 is connected to the motor 20 through the inverter 22. The control module 30 receives a motor torque command $T_{CMD}$ from a source 34 such as, for example, a steering control system. The control module 30 includes control logic for sending a motor voltage command $V_{LL}$ to the motor 20 through the inverter 22.

Figure 2:
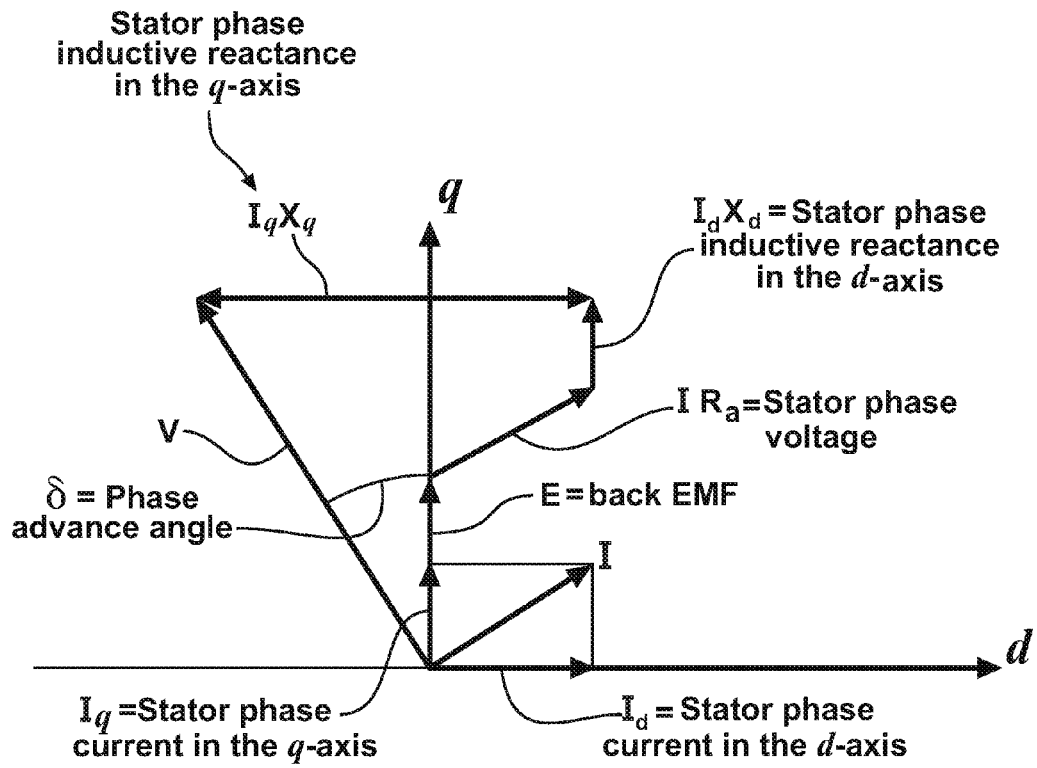
FIG. 2 is a phasor diagram of a motor shown in FIG. 1.

Referring now to FIGS. 1 and 2, the motor 20 is operated such that a phase of the motor voltage command $V_{LL}$ shifts versus a phase of a developed back electromotive force (BEMF) voltage $E_g$ of the motor 20. A phasor diagram of the motor 20 is shown in FIG. 2 and illustrates a voltage vector V having a magnitude that is the motor voltage command $V_{LL}$. A BEMF voltage vector E has a magnitude that is the BEMF voltage $E_g$. An angle is measured between voltage vector V and the BEMF voltage vector E, and is referred to as a phase advance angle δ. A stator phase current is referred to as I, a stator phase current in the q-axis is referred to as $I_q$, a stator phase current in the d-axis is referred to as $I_d$, a stator phase reactance in the respective d-axis is referred to as $X_d$, the stator phase reactance in the q-axis is referred to as $X_q$, and a stator phase resistance at phase A is referred to as $R_a$.

In one exemplary embodiment, an encoder 36 (shown in FIG. 1) is used to measure an angular position θ of a rotor (not shown in FIG. 1) of the motor 20. The angular position θ of the motor 20 is used to determine the input phase voltages $V_a$, $V_b$ and $V_c$, where input phase voltage $V_a$ corresponds with connection A, input phase voltage $V_b$ corresponds with connection B, and input phase voltage $V_c$ corresponds with connection C. The control module 30 includes control logic for calculating input phase voltages $V_a$, $V_b$, and $V_c$ by equations 1-3 as:

$$V_a = V \sin(\delta + \theta) \quad \text{Equation 1}$$

$$V_b = V \sin(\delta + \theta + 120°) \quad \text{Equation 2}$$

$$V_c = V \sin(\delta + \theta + 240°) \quad \text{Equation 3}$$

Figure 3:
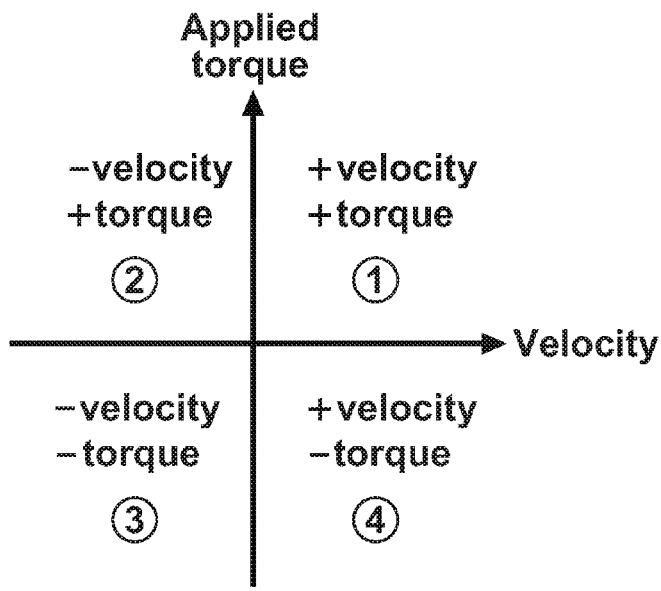
FIG. 3 is an exemplary diagram illustrating the four quadrants of operation for the motor shown in FIG. 1.

The motor 20 rotates in a clockwise as well as a counterclockwise direction, and may also produce torque in both the clockwise and counterclockwise direction during operation. Therefore, the motor 20 operates in all four quadrants of operation, which is illustrated in FIG. 3. FIG. 3 is an exemplary diagram illustrating the four quadrants of operation for the motor 20, where quadrant 1 includes positive velocity and positive torque, quadrant 2 includes negative velocity and positive torque, quadrant 3 includes negative velocity and negative torque, and quadrant 4 includes positive velocity and negative torque. In the event that the motor 20 is operating in either quadrant 2 or quadrant 4, the motor 20 may create a regenerative current that is sent back into the DC power supply 24 (shown in FIG. 1). The motor control system 10 (shown in FIG. 1) is configured for limiting the regenerative current as the motor 20 operates in quadrant 2 and quadrant 4 to a threshold value. In one exemplary embodiment, the threshold value for the regenerative current may be about 15 Amps, however it is to be understood that the regenerative current may be limited to other values as well.

A technique commonly referred to as phase advance is employed to produce a field weakening current Id of the motor 20. The field weakening current Id is out of phase with the BEMF voltage $E_g$ by about 90 degrees. Phase advance involves allowing the phase of the motor voltage command $V_{LL}$ to shift versus the phase of the BEMF voltage $E_g$ by the phase advance angle δ (shown in FIG. 2). Specifically, the control module 30 includes control logic for determining a target field weakening current that is referred to as $I_{dTARGET}$. The target field weakening current $I_{dTARGET}$ is configured for limiting the regenerative current that is created by the motor 20 to the threshold value.

Figure 4:
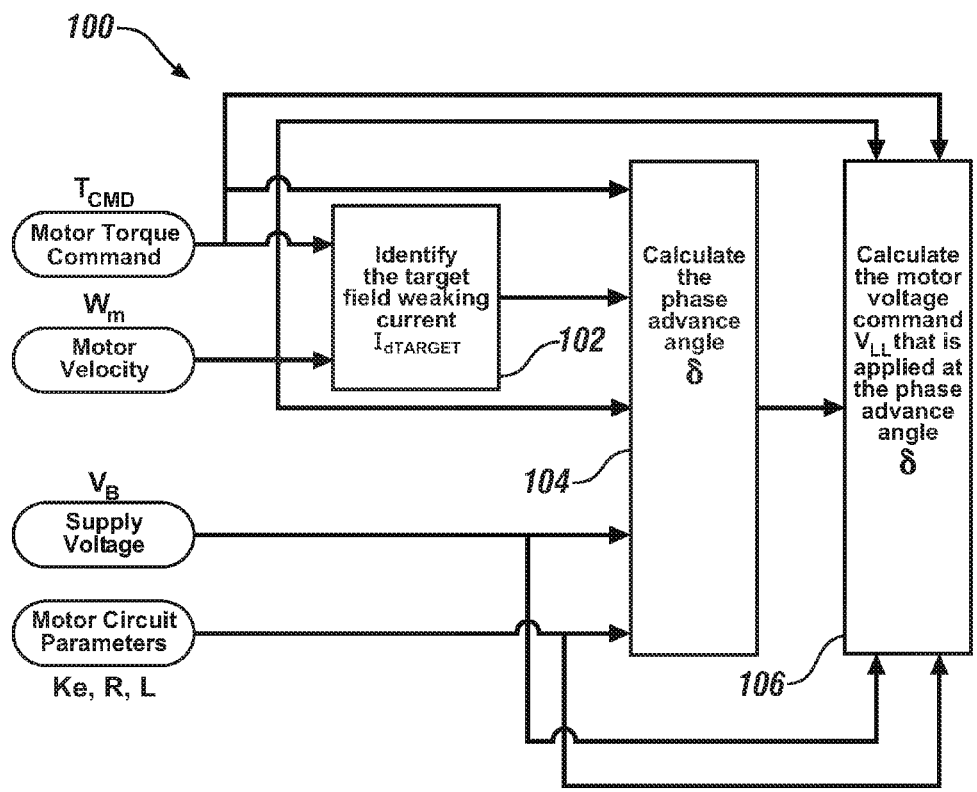
FIG. 4 is a block diagram illustrating one approach for controlling the motor shown in FIG. 1 according to one aspect of the invention.

FIG. 4 is an exemplary block diagram 100 illustrating one approach for employing phase advance that is calculated by the control module 30 (shown in FIG. 1). The control module 30 includes control logic for monitoring the motor 20 (also shown in FIG. 1) for a rotational velocity. Specifically, the control module 30 may be in communication with a speed measuring device (not shown in FIG. 1) that provides an output indicating an angular velocity $\omega_m$ of the motor 20. Alternatively, the angular velocity $\omega_m$ of the motor 20 may be calculated by differentiating the angular position θ, where $d\theta/dt = \omega_m$. The angular velocity $\omega_m$ may also be referred to as the mechanical velocity of the motor 20, and is measured in radians/second. The control module 30 includes control logic for also calculating an electrical velocity $\omega_e$ of the motor 20, where the electrical velocity is calculated by multiplying the mechanical velocity $\omega_m$ by a number of poles $N_p$ of the motor 20, and dividing the product of the mechanical velocity $\omega_m$ and the number of poles $N_p$ by two.

In one embodiment, a memory of the control module 30 also stores several motor circuit parameters. Specifically, in one embodiment, the motor circuit parameters include a motor voltage constant $K_e$ that is measured in volts/radian/second, a motor and control module output circuit resistance R that is measured in Ohms, and a motor synchronous inductance L that is measured in Henries. In another embodiment, the control module 30 may include control logic for calculating the motor circuit parameters motor voltage constant $K_e$, the motor and control module output circuit resistance R, and the motor synchronous inductance L. Specifically, the motor voltage constant $K_e$, the motor and control module output circuit resistance R, and the motor synchronous inductance L vary with temperature. Also, the motor voltage constant $K_e$ and the motor synchronous inductance L vary with motor current due to saturation effects. Examples of how to calculate the motor circuit parameters may be found in commonly owned U.S. Pat. Nos. 6,900,607, 7,071,649, 7,199,549, and 7,576,506, which are herein incorporated by reference. The control module 30 also includes control logic for monitoring the supply voltage $V_B$ to the motor 20. The control module 30 includes control logic for identifying a specific value of the target field weakening current $I_{dTARGET}$ based on the motor torque command $T_{CMD}$ and the mechanical velocity $\omega_m$, which is shown in block 102.

The control module 30 may calculate the specific value of the target field weakening current $I_{dTARGET}$ using a variety of approaches. For example, in one embodiment, the memory of the control module 30 includes a 3D lookup table that has specific values of the target field weakening current $I_{dTARGET}$ corresponding to the motor torque command $T_{CMD}$, the mechanical velocity $\omega_m$, and the specific quadrant of operation of the motor 20 (illustrated in FIG. 3). The target field weakening current $I_{dTARGET}$ is employed as the motor 20 operates in either quadrant 2 or quadrant 4. In another embodiment, the control module 30 may include control logic for calculating the specific value of the target field weakening current $I_{dTARGET}$. One approach for determining the target field weakening current $I_{dTARGET}$ is described below and shown in FIG. 6.

Referring back to FIG. 4, block 104 receives the target field weakening current $I_{dTARGET}$, the motor torque command $T_{CMD}$, the mechanical velocity $\omega_m$, the motor voltage constant $K_e$, the motor and control module output circuit resistance R, and the motor synchronous inductance L. Block 104 calculates the phase advance angle $\delta$ and a torque producing current of the motor 20 $I_q$. A torque producing current $I_q$ is in phase with the BEMF voltage $E_g$. Specifically, in one approach, the phase advance angle $\delta$ may be calculated using equations 4-7:

$$T_{CMD} = K_e I_q \qquad \text{Equation 4}$$

$$V_q = RI_q + \omega_e L \frac{\sqrt{3}}{2} I_{dTARGET} + K_e \omega_m \qquad \text{Equation 5}$$

$$V_d = -\omega_e L I_q + \frac{\sqrt{3}}{2} R I_{dTARGET} \qquad \text{Equation 6}$$

$$\delta = \text{Tan}^{-1}\left(\frac{-V_d}{V_q}\right) \qquad \text{Equation 7}$$

where $V_q$ is a q-axis applied motor voltage of the motor 20 that is a component of voltage in phase with the BEMF voltage Eg, and $V_d$ is a d-axis applied motor voltage that is a component of voltage that is 90 degrees out of phase with the BEMF voltage Eg.

Block 106 receives the phase advance angle $\delta$, the motor torque command $T_{CMD}$, the mechanical velocity $\omega_m$, the motor voltage constant $K_e$, the motor and control module output circuit resistance R, and the motor synchronous inductance L. Block 106 then calculates the motor voltage command $V_{LL}$. Specifically, in one approach, the motor voltage command $V_{LL}$ may be calculated using equation 8:

$$V_{LL} = \text{Sign}(V_q)\sqrt{V_q^2 + V_d^2} \qquad \text{Equation 8}$$

Once the motor voltage command $V_{LL}$ and the phase advance angle $\delta$ have been calculated, the control module 30 includes control logic for sending the motor voltage command $V_{LL}$ that is applied at the phase advance angle $\delta$ to the motor 20.

Figure 5:
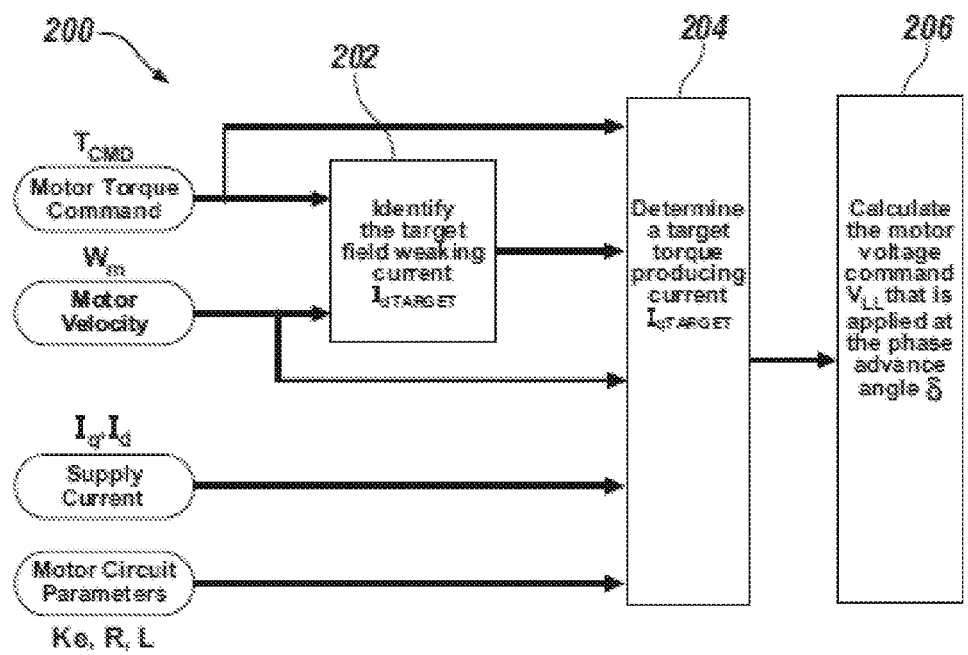
FIG. 5 is a block diagram illustrating another approach for controlling the motor shown in FIG. 1 according to another aspect of the invention.

FIG. 5 is an exemplary block diagram 200 illustrating another approach for employing phase advance that is calculated by the control module 30 (shown in FIG. 1) using a closed loop approach. Specifically, in the embodiment as shown in FIG. 5, the motor control system 10 (shown in FIG. 1) is operating within a closed loop current control of the inverter 22 (shown in FIG. 1). The control module 30 includes control logic for monitoring the motor 20 for the torque producing current $I_q$ and the field weakening current $I_d$ of the motor 20 during operation. The control module 30 includes control logic for identifying the specific value of the target field weakening current $I_{dTARGET}$ based on the motor torque command $T_{CMD}$ and the mechanical velocity $\omega_m$, which is shown in block 202. Similar to the approach as described in FIG. 4, the control module 30 may calculate the specific value of the target field weakening current $I_{dTARGET}$ using a 3D lookup table that has specific values of the target field weakening current $I_{dTARGET}$ corresponding to the motor torque command $T_{CMD}$ and the mechanical velocity $\omega_m$. Alternatively, the control module 30 may include control logic for calculating the specific value of the target field weakening current $I_{dTARGET}$.

Block 204 receives the target field weakening current $I_{dTARGET}$, the motor torque command $T_{CMD}$, the mechanical velocity $\omega_m$, the torque producing current $I_q$, the field weakening current $I_d$, the motor voltage constant $K_e$, the motor and control module output circuit resistance R, and the motor synchronous inductance L. Block 204 calculates a target torque producing current $I_{qTARGET}$ that is used to drive the motor 20 using closed loop control based on the values that are inputted into block 204. The target torque producing current $I_{qTARGET}$ may be calculated by equation 9:

$$\frac{T_{CMD}}{K_e} = I_{qTARGET} \qquad \text{Equation 9}$$

Block 204 further includes receiving the torque producing current $I_q$ and the field weakening current $I_d$, and comparing the torque producing current $I_q$ with the target torque producing current $I_{qTARGET}$ and the field weakening current $I_d$ with the target field weakening current $I_{dTARGET}$. Specifically, block 204 adjusts the values of the q-axis applied motor voltage $V_q$ and the d-axis applied motor voltage $V_d$ to ensure that the target torque producing current $I_{qTARGET}$ and the target field weakening current $I_{dTARGET}$ are both met. Equations 10-11 show the relationship between the d-axis applied motor voltage $V_d$, the q-axis applied motor voltage $V_q$, the target torque producing current $I_{qTARGET}$ and the target field weakening current $I_{dTARGET}$:

$$V_q = RI_{qTARGET} + \omega_e L \frac{\sqrt{3}}{2} I_{dTARGET} + K_e \omega_m \qquad \text{Equation 10}$$

$$V_d = -\omega_e L I_{qTARGET} + \frac{\sqrt{3}}{2} R I_{dTARGET} \qquad \text{Equation 11}$$

Block 206 receives the values of the q-axis applied motor voltage $V_q$ and the d-axis applied motor voltage $V_d$ calculated at the target field weakening current $I_{dTARGET}$ and the target torque producing current $I_{qTARGET}$. Block 206 calculates the magnitude of the motor voltage command $V_{LL}$ and the phase advance angle $\delta$. The phase advance angle $\delta$ may be calculated by equation 12:

$$\delta = \text{Tan}^{-1}\left(\frac{-V_d}{V_q}\right) \quad \text{Equation 12}$$

The equation for motor voltage command $V_{LL}$ is described below in equation 17. The control module 30 includes control logic for sending the motor voltage command $V_{LL}$ that is applied at the phase advance angle δ to the motor 20.

Figure 6:
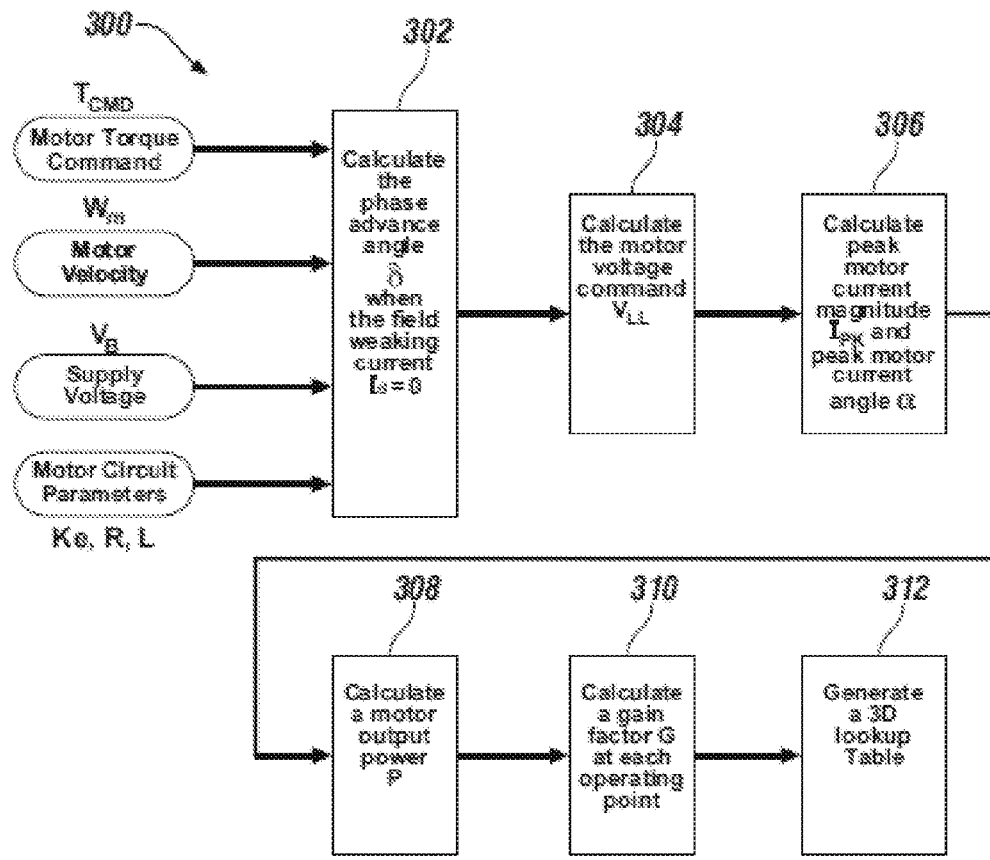
FIG. 6 is a block diagram illustrating yet another aspect of the invention.

FIG. 6 is a block diagram 300 illustrating an approach to calculate the specific value of the target field weakening current $I_{dTARGET}$ based on the motor torque command $T_{CMD}$ and the mechanical velocity $\omega_m$. In the embodiment as discussed, the control module 30 includes control logic for calculating the specific value of the target field weakening current $I_{dTARGET}$, however it is understood that the calculations may also be performed offline by a computing device that is external to the motor control system 10 as well. Performing the calculations offline may result in less processing required by a microprocessor (not shown in FIG. 1) of the control module 30. Referring to block 302, the control module 30 includes control logic for identifying a specific value of the phase advance angle δ based on a target field weakening current Id of zero, the motor torque command $T_{CMD}$, the mechanical velocity $\omega_m$, the supply voltage $V_B$, the motor voltage constant Ke, the motor and control module output circuit resistance R, and the motor synchronous inductance L. Specifically, the control module 30 (or an offline computer) includes control logic for calculating the angle δ when the value of the target field weakening current $I_d$ is about zero amps. The phase advance angle δ may be calculated using equations 13-16, which are similar to equations 5-7 except that the target field weakening current $I_{dTARGET}$ is now zero:

$$T_{CMD} = K_e I_q \quad \text{Equation 13}$$

$$V_q = RI_q + K_e \omega_m \quad \text{Equation 14}$$

$$V_d = -\omega_e L I_q \quad \text{Equation 15}$$

$$\delta = \text{Tan}^{-1}\left(\frac{-V_d}{V_q}\right) \quad \text{Equation 16}$$

Block 304 calculates the motor voltage command $V_{LL}$ that may be calculated using equation 17:

$$V_{LL} = \text{Sign}(V_q)\sqrt{V_q^2 + V_d^2} \quad \text{Equation 17}$$

The motor voltage command $V_{LL}$ is then sent to block 306. In block 306, a peak motor current magnitude $I_{pk}$ is calculated. Specifically, the peak motor current magnitude $I_{pk}$ may be calculated using the equations 18-21:

$$\hat{V} = V\cos(\delta) + jV\sin(\delta) \quad \text{Equation 18}$$

$$\hat{E} = Eg = \omega_m Ke \quad \text{Equation 19}$$

$$\hat{Z} = R + j\omega_e L \quad \text{Equation 20}$$

$$I_{pk} = \left|\frac{\hat{V}-\hat{E}}{\hat{Z}}\right| \quad \text{Equation 21}$$

where the variable $\hat{V}$ is the unit vector of the voltage vector V, the variable $\hat{E}$ represents the unit vector of the BEMF voltage Eg, and the variable $\hat{Z}$ is a motor circuit impedance vector.

Block 306 also calculates a peak motor current angle α, which is calculated using equation 22:

$$\alpha = \text{Tan}^{-1}\left(\frac{V\sin(\delta)}{V\cos(\delta)-E_g}\right) - \text{Tan}^{-1}\left(\frac{\omega_e L}{R}\right) \quad \text{Equation 22}$$

The peak motor current magnitude $I_{pk}$ and the peak motor current angle α are both sent to block 308. Block 308 calculates a motor output power P. The motor output power P may be calculated using equation 23:

$$P = \frac{\sqrt{3}}{2} V_{LL} I_{pk} \cos(\alpha - \delta) \quad \text{Equation 23}$$

The peak motor current magnitude $I_{pk}$, the peak motor current angle α, and the motor output power P are each sent to block 310. In block 310, a gain factor G represents a relationship between the motor output power P when the field weakening current Id is zero (calculated in block 308), and a value of the target field weakening current $I_{dTARGET}$ where the motor output power P is modified to a value that will create a target supply current $I_B$. Thus, the motor output power P is dissipated in the motor 20 through a non-zero field weakening current Id (i.e. the target field weakening current $I_{dTARGET}$, instead of dissipating the motor output power P back to the DC supply voltage 24). The target field weakening current $I_{dTARGET}$ is generated by applying the gain factor G to the motor output power P in block 308. The relationship between the supply current $I_B$ and the motor output power P may be expressed in equation 24:

$$I_B = \frac{V_B - \sqrt{V_B^2 - 4R_{BH}P}}{2R_{BH}} \quad \text{Equation 24}$$

where the variable $R_{BH}$ is the input resistance between the DC power supply 24 and the inverter 22. As seen in Equation 24, the power dissipation of the motor 20 is proportional to the supply current $I_B$ squared. Therefore, a square root of an absolute value of the motor output power P is scaled using the gain factor G to obtain a value for the supply current $I_B$, which is expressed in Equation 25 as:

$$I_{dTARGET} = G\sqrt{|P|} \quad \text{Equation 25}$$

Equation 25 may be used to calculate the target field weakening current $I_{dTARGET}$ that is required to get the motor output power P to a level such that the regenerated supply current $I_B$ is at or below the threshold value. This is because the gain factor G represents the relationship between the motor output power P when the field weakening current Id is zero and the value of the target field weakening current $I_{dTARGET}$ where the motor output power P creates the target supply current $I_B$. Equation 25 may be used to determine the target field weakening current $I_{dTARGET}$ corresponding to a variety of motor torque command $T_{CMD}$ and mechanical velocity $\omega_m$ values to generate the 3D lookup table that has specific values of the target field weakening current $I_{dTARGET}$ corresponding to the motor torque command $T_{CMD}$ and the mechanical velocity $\omega_m$.

In one approach, equations 4-7 and 17-25 may also be iteratively solved to obtain a value for the target field weakening current $I_{dTARGET}$. Specifically, Equations 4-7 and 17-25 are iteratively solved to obtain a value for the target field weakening current $I_{dTARGET}$ that results in the regenerative current created by the motor 20 being at or below the threshold value, where the motor output power P is calculated at a target value. For example, in one embodiment of the motor control system 10, if the threshold value for the regenerative current is about 15 Amps, then equations 17-25 are empirically solved to obtain a target field weakening current $I_{dTARGET}$ that results in the regenerative current being at or below 15 Amps. Specifically, if the field weakening current Id is zero, this results in the supply current $I_B$ (i.e., the regenerative current) having a value of about −60 amps. The target supply current $I_B$ (i.e. the threshold value of the regenerative current) is about −15 amps. The target value for the motor output power P which results in the supply current $I_B$ of about −15 amps is calculated. The difference between the motor power output P with the field weakening current Id being zero and the target motor output power P where the supply current $I_B$ of about −15 amps represents the amount of motor output power P that needs to be dissipated in the motor 20 in order for the regenerative current to be −15 amps. It should be noted that the target field weakening current $I_{dTARGET}$ is only calculated for negative values of the motor output power P (i.e. only in quadrant 2 and quadrant 4 of FIG. 3).

The target field weakening current $I_{dTARGET}$ is calculated for various operating points of the motor 20 (i.e. various values of the motor torque command $T_{CMD}$, the mechanical velocity $\omega_m$, and the supply voltage $V_B$.) Then, if the supply voltage $V_B$ is held generally constant, the 3D lookup table is generated in block 312. The 3D lookup table includes values for the target field weakening current $I_{dTARGET}$ based on the mechanical velocity $\omega_m$ and the motor torque command $T_{CMD}$. The 3D lookup table may be implemented as a set of nonlinear curves. In another embodiment, the 3D lookup table may be linearized and implemented as a line representing the target field weakening current $I_{dTARGET}$ versus the mechanical velocity $\omega_m$, where a slope of the line is dependent on the motor torque command $T_{CMD}$.

In one embodiment, the approach illustrated in the block diagram 300 is performed by a computing device (not shown) that is external to the motor control system 10. Specifically, a computing device such as, for example, a personal computer or a laptop computer may be used to calculate the specific value of the target field weakening current $I_{dTARGET}$ based on the motor torque command $T_{CMD}$ and the mechanical velocity $\omega_m$. The 3D lookup table that is generated in block 312 is then saved in the memory of the control module 30. Saving the 3D lookup table in the memory of the control module 30 may result in less processing that is required by a microprocessor (not shown in FIG. 1) of the control module 30. Alternatively, in another embodiment, the control module 30 includes control logic for calculating the specific value of the target field weakening current $I_{dTARGET}$ based on the motor torque command $T_{CMD}$ and the mechanical velocity $\omega_m$ as shown in blocks 302-310.

Figure 7:
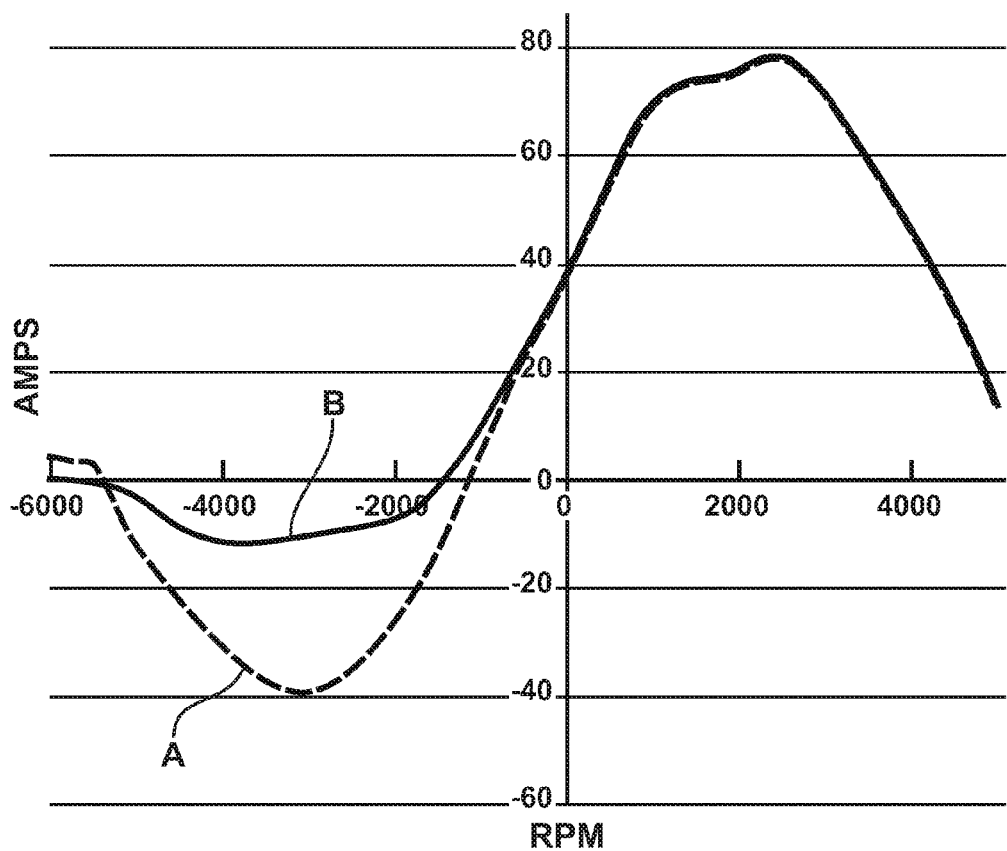
FIG. 7 is a graph illustrating operation of the motor shown in FIG. 1 with and without the invention.

FIG. 7 is an exemplary illustration of a graph illustrating operation of the motor 20 with a field weakening current Id that is zero, and a field weakening current Id that is calculated by the steps described above in FIGS. 3-6. FIG. 7 illustrates motor RPM versus a supply current of the motor 20, which is measured in Amps. Line A illustrates operation of the motor 20 generated from a control that sets a phase advance angle δ to generate a field weakening current Id that is zero in the second quadrant, and Line B illustrates operation of the motor 20 that sets a phase advance angle δ to generate the target field weakening current $I_{dTARGET}$. It should be noted that Line A and Line B are generated by applying a generally constant torque command to the motor 20 over a range of various motor RPMs, except at relatively high speeds. At relatively higher motor RPM (in one example at about 2000 RPM or higher), the torque command reduces with motor RPM due to the characteristics of the motor 20.

As seen in FIG. 7, a field weakening current Id that is zero results in a regenerative current that is as high as about 40 Amps. Also, in the event a phase advance angle δ of zero is employed, the regeneration current may be relatively lower, but the motor current may reach a level that the control module is not rated to withstand. However, when the target field weakening current $I_{dTARGET}$ is employed, the regenerative current is limited to about 15 Amps or less. Limiting the regenerative current may be required in some situations. For example, in the event the DC power supply 24 is a vehicle battery, over time the performance of the vehicle battery may decrease. Therefore, if battery performance is diminished or if a vehicle electrical system issue arises, the regenerative current may not be absorbed by the DC power supply. The motor control system 10 as described in FIGS. 1-7 also limits the regenerative current without large, bulky passive elements that may be difficult to package. The motor control system 10 may also be employed to meet torque versus speed requirements of the motor 30 for quadrant 1 and quadrant 3 (shown in FIG. 1) in addition to reducing the regenerative current.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A motor control system, comprising:
    a motor operating at a rotational velocity, the motor creating a regenerative current during a portion of the motor operation, the motor having a plurality of motor circuit parameters; and
    a control module in communication with the motor and configured to limit the regenerative current to a threshold value, the control module receiving a motor torque command, comprising:
        a control logic for identifying a target field weakening current value sufficient to limit the regenerative current to the threshold value, the control logic configured to identify the target field weakening current value based upon the motor torque command and the rotational velocity of the motor, the control logic identifying the target field weakening current using a plurality of variable values of the target field weakening current stored in a memory and based on the motor torque command, the rotational velocity and a quadrant of operation of the motor;
        a control logic for determining a phase advance angle configured to generate a field weakening current at the target field weakening current value; and
        a control logic for determining a motor voltage command based on the motor torque command, the rotational velocity and the plurality of motor circuit parameters, the motor voltage command applied at the phase advance angle during the portion of the motor operation in which the motor is creating the regenerative current.

2. The motor control system as recited in claim 1, wherein the memory of the control module stores the data structure as a 3D lookup table that is used to identify target field weakening current, wherein the 3D lookup table includes values for the target field weakening current based on the motor torque command and the rotational velocity of the motor.

3. The motor control system as recited in claim 1, wherein the plurality of motor circuit parameters include a motor voltage constant $K_e$ that is measured in volts/radian/second, a motor and control module output circuit resistance R that is measured in Ohms, and a motor synchronous inductance L that is measured in Henries, and wherein the phase advance angle based on at least the plurality of motor circuit parameters.

4. The motor control system as recited in claim 1, wherein the threshold value for the regenerative current is about 15 Amps.

5. The motor control system as recited in claim 1, wherein the control module includes control logic for sending the motor voltage command that is applied at the phase advance angle to the motor.

6. The motor control system as recited in claim 3, wherein the control module includes control logic for calculating the target field weakening current, and wherein the target field weakening current is based on a value of the phase advance angle when a field weakening current is about zero amps.

7. The motor control system as recited in claim 3, wherein the target field weakening current is further based on a motor output power, wherein the motor output power is calculated using the following equation:

$$P = \frac{\sqrt{3}}{2} V_{LL} I_{pk} \cos(\alpha - \delta)$$

wherein $I_{pk}$ is a peak motor current magnitude, $\alpha$ is a peak motor current angle, $\delta$ is the phase advance angle, and P is the motor output power.

8. The motor control system as recited in claim 6, wherein the value of the phase advance angle when the field weakening current is about zero amps is calculated using the following equations:

$$T_{CMD} = K_e I_q$$
$$V_q = R I_q + K_e \omega_m$$
$$V_d = -\omega_e L I_q$$
$$\delta = \tan^{-1}\left(\frac{-V_d}{V_q}\right)$$

wherein $T_{CMD}$ is the motor torque command, $I_q$ is a torque producing current, $V_q$ is a q-axis applied motor voltage of the motor, and $V_d$ is a d-axis applied motor voltage of the motor, $\omega_m$ is a mechanical velocity of the motor, $\omega_e$ is an electrical velocity of the motor, and $\delta$ is the phase advance angle.

9. The motor control system as recited in claim 8, wherein the mechanical velocity $\omega_m$ is the rational velocity of the motor, and wherein the electrical velocity $\omega_e$ is calculated by multiplying the mechanical velocity $\omega_m$ by a number of poles $N_p$ of the motor, and dividing a product of the mechanical velocity $\omega_m$ and the number of poles $N_p$ by two.

10. The motor control system as recited in claim 8, wherein the motor voltage command is calculated using the following equation:

$$V_{LL} = \sin(V_q)\sqrt{V_q^2 + V_d^2}$$

wherein $V_{LL}$ is the motor voltage command.

11. The motor control system as recited in claim 7, wherein the target field weakening current is further based on a parameter, wherein the parameter represents a relationship between i) a square root of an absolute value of the motor output power P when a field weakening current is zero and ii) a value of the target field weakening current $I_{dTARGET}$.

12. A motor control system, comprising:
a motor operating at a rotational velocity, the motor creating a regenerative current during a portion of the motor operation, the motor having a plurality of motor circuit parameters, a torque producing current, and a field weakening current; and
a control module in communication with the motor and configured for limiting the regenerative current to a threshold value in a second quadrant and a fourth quadrant of operation, the control module receiving a motor torque command, comprising:
a control logic for identifying the target field weakening current value sufficient to limit the regenerative current to the threshold value, the control logic configured to identify the target field weakening current value based upon the motor torque command and the rotational velocity of the motor, the control logic identifying the target field weakening current using a plurality of variable values of the target field weakening current stored in a memory and based on the motor torque command, the rotational velocity and a quadrant of operation of the motor;
a control logic for monitoring the motor for the torque producing current and the field weakening current;
a control logic for calculating a target torque producing current based on the motor torque command;
a control logic for comparing the torque producing current with the target torque producing current and the field weakening current with the target field weakening current;
a control logic for determining a phase advance angle configured to generate the field weakening current at the target field weakening current value; and
a control logic for determining a motor voltage command based on the motor torque command, the rotational velocity and the plurality of motor circuit parameters, the motor voltage command applied at the phase advance angle during the second quadrant and the fourth quadrant of operation.

13. The motor control system as recited in claim 12, wherein the memory of the control module stores a 3D lookup table that is used to identify target field weakening current, wherein the 3D lookup table includes values for the target field weakening current based on the motor torque command and the rotational velocity of the motor.

14. The motor control system as recited in claim 12, wherein the plurality of motor circuit parameters include a motor voltage constant $K_e$ that is measured in volts/radian/second, a motor and control module output circuit resistance R that is measured in Ohms, and a motor synchronous inductance L that is measured in Henries, and wherein the phase advance angle based on at least the plurality of motor circuit parameters.

15. The motor control system as recited in claim 14, wherein the control module includes control logic for calculating the target field weakening current, and wherein the target field weakening current is based on a value of the phase advance angle when a field weakening current is about zero amps.

16. The motor control system as recited in claim 15, wherein the value of the phase advance angle when the field weakening current is about zero amps is calculated using the following equations:

$$T_{CMD} = K_e I_q$$

$$V_q = RI_q + K_e \omega_m$$

$$V_d = -\omega_e L I_q$$

$$\delta = \mathrm{Tan}^{-1}\left(\frac{-V_d}{V_q}\right)$$

wherein $T_{CMD}$ is the motor torque command, $I_q$ is the torque producing current, $V_q$ is a q-axis applied motor voltage of the motor, and $V_d$ is a d-axis applied motor voltage of the motor, $\omega_m$ is a mechanical velocity of the motor, $\omega_e$ is an electrical velocity of the motor, and $\delta$ is the phase advance angle, and wherein the control module includes control logic for adjusting the values of the of the q-axis applied motor voltage and the d-axis applied motor voltage based on the target torque producing current and the target field weakening current.

17. The motor control system as recited in claim 15, wherein the target field weakening current is further based on a motor output power, wherein the motor output power is calculated using the following equation:

$$P = \frac{\sqrt{3}}{2} V_{LL} I_{pk} \mathrm{Cos}(\alpha - \delta)$$

wherein $I_{pk}$ is a peak motor current magnitude, $\alpha$ is a peak motor current angle, $\delta$ is the phase advance angle, and P is the motor output power.

18. The motor control system as recited in claim 16, wherein the mechanical velocity $\omega_m$ is the rotational velocity of the motor, and wherein the electrical velocity $\omega_e$ is calculated by multiplying the mechanical velocity $\omega_m$ by a number of poles $N_p$ of the motor, and dividing a product of the mechanical velocity $\omega_m$ and the number of poles $N_p$ by two.

19. The motor control system as recited in claim 16, wherein the motor voltage command is calculated using the following equation:

$$V_{LL} = \mathrm{Sin}(V_q)\sqrt{V_q^2 + V_d^2}$$

wherein $V_{LL}$ is the motor voltage command, and wherein the control module includes control logic for sending the motor voltage command that is applied at the phase advance angle to the motor.

20. The motor control system as recited in claim 17, wherein the target field weakening current is further based on a parameter, wherein the parameter represents a relationship between i) a square root of an absolute value of the motor output power P when a field weakening current is zero and ii) a value of the target field weakening current $I_{dTARGET}$.

* * * * *